May 19, 1953     J. E. STOTT     2,639,118
ROTATION INDICATOR FOR PLUG-COCK TYPE OF VALVES
Filed July 24, 1950
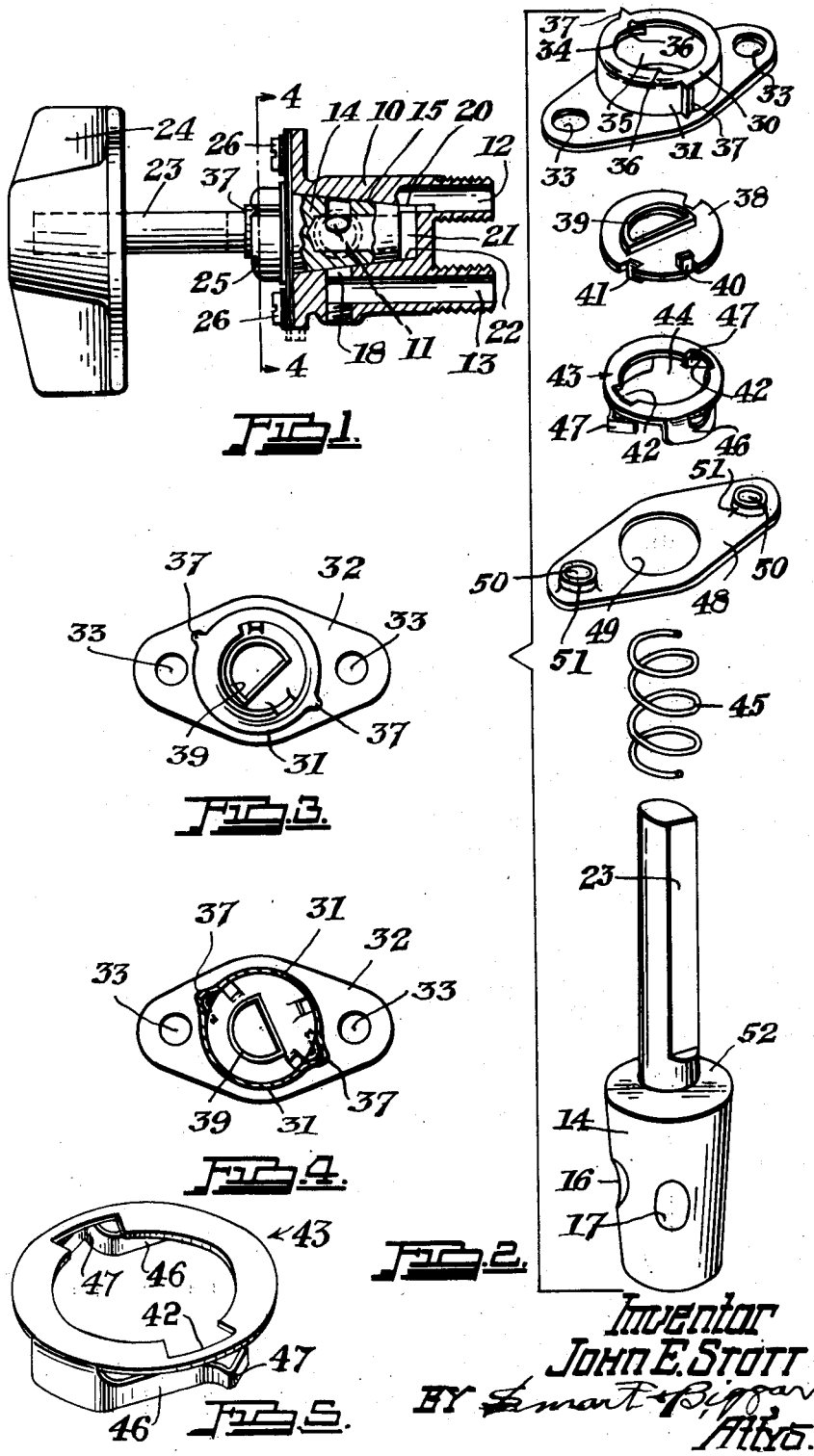

Patented May 19, 1953

2,639,118

UNITED STATES PATENT OFFICE 2,639,118

ROTATION INDICATOR FOR PLUG-COCK TYPE OF VALVES

John E. Stott, Wallaceburg, Ontario, Canada, assignor to Wallaceburg Brass Limited, Wallaceburg, Ontario, Canada, a corporation of Canada Application July 24, 1950, Serial No. 175,515
In Canada May 5, 1950

4 Claims. (Cl. 251—163)

1

The invention relates to a rotation indicator for a coil spring loaded plug-cock type of valve.

Prior to the invention, attempts have been made to provide devices which would indicate a given position of rotation of the plug in a plugcock type of valve by a click sound at an intermediate point, or by increased pressure being required to turn the valve at the given position, or sometimes by both indications. In the prior constructions, the detenting action was obtained by means of washers about the stem of the valve, the washers having indentations and bosses which caused the detenting action. In these arrangements, the coil spring, which maintains the plug of the valve in its seat, was retained under pressure by bearing against the detent washers so that there arose the serious disadvantage that as the plug of the valve was rotated and the washers passed through their detenting position, there was a movement of at least one of the washers in an axial direction of the stem of the valve, thereby causing a variation in the pressure exerted by the spring. This was a serious disadvantage, since in a plug-cock type of valve it is important that the pressure on the load spring be neither too great nor too little for, if it be too great, the valve will be sticky and difficult to operate and, if it be too little, there is danger of leakage of fluid from the valve.

Another disadvantage of the prior art arrangements was that failure of one of the parts which formed the detenting mechanism, usually caused the entire valve to become inoperative, due to the parts being interlocked.

The disadvantages of the prior art are overcome by the present invention by providing a rotation indicator in which the surfaces which coact to form the detenting mechanism are in planes substantially parallel to the axis of the stem of the valve and are independent of the pressure of the load spring of the valve. A rotation indicator according to the present invention comprises a casing arranged to be mounted coaxially of the stem of the valve and about the load spring thereof, the casing having a generally circular wall substantially parallel to the stem of the valve and arranged to surround the load spring of the valve, means within the casing arranged to rotate with the shaft, said means having at least one spring arm bearing against the inner surface of the circular wall of the casing, the spring arm and the wall of the casing coacting to form a detent at a given degree of rotation, and means within the casing forming a pressure bearing surface for the coil spring whereby the coil spring is kept at a substantially uniform pressure during rotation of the stem of the valve.

According to the invention, it is preferred to have two spring arms, each having a projecting U-shaped portion bearing against the inner sur-

2 face of the circular wall of the casing at diametrically opposite positions, and to have two diametrically opposite U-shaped recesses in the circular wall of the casing to receive the U-shaped portions of the spring arms, thereby forming a detent. With this arrangement the diametrically opposed forces exerted by the spring arms are substantially cancelled, thus reducing the possibility of unbalanced radial forces acting on the plug of the valve.

The advantages of a rotation indicator according to the invention arise from the fact that the detenting surfaces are in planes substantially parallel to the axis of the stem of the valve and, therefore, do not cause variation in the pressure of the load spring during detenting. It is important to note that, according to the invention, the spring arm which forms part of the detent mechanism has the sole function of indicating by sound and feel when a given degree of rotation of the plug of the valve has been reached. Further, a rotation indicator according to the invention is cheap to manufacture and can be preassembled as a unit with a base plate permanently enclosing the component parts within their casing and the complete rotation indicator assembly can be attached to, or removed from, a valve without unseating the plug of the valve.

The invention will be further described with reference to the attached drawings in which a preferred embodiment is illustrated and, in which Figure 1 is a side view of an assembled rotation indicator according to the invention, with the indicator mounted on a coil spring loaded plug-cock type of gas valve shown partly in cross-section;

Figure 2 is an exploded view of the rotation indicator shown in Figure 1;

Figure 3 is a plan view of the rotation indicator shown in Figure 1, and

Figure 4 is a cross-sectional view of the rotation indicator shown in Figure 1, taken on the line 4—4 of Figure 1, and Figure 5 is a perspective view of the spring arm plate which forms a part of the rotation indicator.

The plug-cock type of gas valve shown in Figure 1 is only one example of a plug-cock type of valve construction with which a rotation indicator according to the invention may be used and is shown to illustrate the mounting and operation of the rotation indicator. The valve has a body 10, having an inlet port 11 (shown in dotted line), outlet ports 12 and 13, and a tapered plug 14. The plug 14 is seated in the body 10 and has an axial passageway 15 and a pair of side passageways 16 and 17 (see Figure 2) extending from the central passageway 15 to the outer surface of the plug 14. The passageways 16 and 17 are arranged upon rotation of the plug 14 to come into alignment with the inlet port 11 and with a side passageway 18 in the body 10 leading to the outlet port 13. The outlet port 12 is connected through a small opening 20 into the space 21 between the end of the plug 14 and the bottom of the plug seat 22 in the body 10 of the valve. The opening 20 provides sufficient gas for the low flame of a gas burner. A stem 23, of generally D-shaped cross-section, is formed integrally of the plug 14 and has attached to it a knob 24.

A rotation indicator 25, according to the invention, is shown mounted by screws 26 to the body 10 of the valve.

As shown in Figures 2, 3 and 4, the assembly of the rotation indicator 25 consists of a casing 30 having a circular wall 31 and a base plate 32 in which holes 33 are used in mounting the rotation indicator on the valve as shown in Figure 1. At one end, the circular wall 31 terminates in a turned-in rim 34 having an opening 35 of a generally circular shape. As shown in the figures, one side of the opening 35 has a smaller radius than the other side thereby providing the stops 36 referred to below. The circular wall 31 has a pair of diametrically opposite U-shaped recesses 37 which form part of the detent mechanism to be described below.

A stop plate 38 of generally disc shape is of such a diameter that it fits within the casing 30 and can rotate therein. The plate 38 has a D-shaped opening 39 adapted to fit closely over the stem 23 of the valve so that the plate 38 will turn with the plug 14 of the valve. The plate 38 has a turned-up stop lug 40 and a pair of turned-down driving lugs 41. The stop lug 40 is arranged to stop against the stops 36 of the casing 30, and the driving lugs 41 are arranged to fit into recesses 42 in a spring arm plate 43. As shown, the spring arm plate 43 has an opening 44 through which the load spring 45 (Figure 2) of the valve can pass. The plate 43 has a pair of spring arms 46, each formed with a projecting U-shaped portion 47 (see Figure 5).

When the stop plate 38 and the spring arm plate 43 are assembled within the casing 30, the driving lugs 41 fit into the recesses 42 and the spring arms 46 bear against the inner surface of the circular wall 31 of the casing 30. Rotation of the stop plate 38 causes the spring arm plate 43 to be rotated with its spring arms 46 pressing against the inner surface of the circular wall 31, and when the U-shaped projecting portions 47 of the spring arms 46 come into alignment with the U-shaped recesses 37 of the casing 30, they coact to form a detent. The detenting position is made evident to the operator of the valve by a distinct click noise and by a variation in the pressure required to turn the stem 23 of the valve. The stop plate 38 and the spring arm plate 43 are maintained in assembled relation within the casing 30 by a closure plate 48 having a central hole 49 through which the stem 23 of the valve and the load spring 45 may pass. The closure plate 48 has a pair of holes 50 in alignment with the holes 33 in the casing 30. Upturned collars 51 are provided about the holes 50 and are used to permanently to fix the closure plate 48 to the casing 30 by passing the collars 51 through the holes 33 and spinning them over against the casing 30. The assembly of the rotation indicator 25 to a valve is shown in Figure 1 and, as indicated by Figure 2, the load spring 45 of the valve is seated between the stop plate 38 and the upper surface 52 of the plug 14 of the valve. It is to be noted that, by having the hole 49 in the closure plate 48 of a smaller diameter than that of the top of the tapered plug 14, there is obtained the important safety feature of having the tapered plug locked within the body 10 in case of failure of the load spring 45. The closure plate 48 also is of advantage in preventing dirt from getting into the valve seat.

Since the detenting action of the rotation indicator takes place along the outer wall 31 of the casing 30, and this wall is parallel to the direction of the axis of the stem of the valve, there is no variation in the pressure applied to the spring 45 during the detenting action. Moreover, failure of one or both of the spring arms 46 would not interfere with the operation of the valve since it would cause no variation of the pressure on the load spring 45.

What I claim as my invention is:

1. A detent mechanism for a valve, comprising a fixed casing adapted to surround a length of a valve operating stem, said casing having a generally circular inner wall substantially parallel to the axis of rotation of the valve stem, means within said casing having an opening to receive the valve stem to rotate therewith in either direction, said means having at least two diametrically opposed spring arms, each of which has a U-shaped portion bearing against the inner surface of said wall of said casing, said wall of said casing having at least two diametrically opposed U-shaped recesses to receive said U-shaped portions thereby forming a detent at a predetermined degree of rotation of the valve stem.

2. A detect mechanism for a valve as defined in claim 1 in which the generally circular wall of the casing has an inwardly directed flange surrounding the opening for the stem of the valve in said means within said casing, said casing comprising a plate retained by said flange and forming a seat for a valve load spring, and said flange and said plate being adapted to coact to form stops to limit the rotation of said stem.

3. A detent mechanism for a valve as defined in claim 2 in which the means within the casing arranged to rotate with the stem is driven by at least one lug and socket connection between said means and said plate, said means providing a floating connection between said plate and the circular wall of said casing by virtue of the resilience of the spring arms bearing against said wall and by virtue of clearance provided in said lug and socket connection.

4. A detect mechanism for a valve as defined in claim 2, said spring arms being integral with said means within said casing and in which the means within the casing arranged to rotate with the stem is driven by at least one lug and socket connection between said means and said plate, said means providing a floating connection between said plate and the circular wall of said casing by virtue of the resilience of the spring arms bearing against said wall and by virtue of clearance provided in said lug and socket connection.

JOHN E. STOTT.

References Cited in the file of this patent

UNITED STATES PATENTS

| Number | Name | Date |
|---|---|---|
| 585,840 | Dolen | July 6, 1897 |
| 1,521,530 | Hammerstrom | Dec. 30, 1924 |
| 1,921,779 | Roberts | Aug. 8, 1933 |
| 2,161,070 | McDonough | June 6, 1939 |
| 2,177,370 | McDonough | Oct. 24, 1939 |